United States Patent [19]

Gunners et al.

[11] Patent Number: 5,423,179
[45] Date of Patent: Jun. 13, 1995

[54] SOLID FUEL RAMJET ENGINE FOR A SPIN-STABILIZED PROJECTILE

[75] Inventors: Nils-Frik Gunners, Västerhaninge; Yngve Nilsson, Strängnäs; Peter Wimmerström, Stockholm, all of Sweden

[73] Assignee: Försvarets Forskningsanstalt, Sundyberg, Sweden

[21] Appl. No.: 162,170

[22] PCT Filed: Jun. 15, 1992

[86] PCT No.: PCT/SE92/00431
§ 371 Date: Apr. 4, 1994
§ 102(e) Date: Apr. 4, 1994

[87] PCT Pub. No.: WO92/22742
PCT Pub. Date: Dec. 23, 1992

[30] Foreign Application Priority Data

Jun. 14, 1991 [SE] Sweden ........................ 9101846

[51] Int. Cl.⁶ .................................................. F02K 7/10
[52] U.S. Cl. ........................................ 60/201; 60/251; 60/270.1; 102/291
[58] Field of Search .............. 60/201, 250, 251, 253, 60/270.1; 102/284, 287, 289, 291

[56] References Cited

U.S. PATENT DOCUMENTS

| 1,901,852 | 3/1933 | Stolfa | 60/250 |
| 3,380,386 | 4/1968 | Guenter | 102/291 |
| 3,535,881 | 10/1970 | Schubert | 60/251 |
| 4,052,846 | 10/1977 | Schadow . | |
| 4,796,534 | 1/1989 | Mikhail . | |
| 5,125,229 | 6/1992 | Coleno et al. | 60/250 |

FOREIGN PATENT DOCUMENTS 419884 8/1981 Sweden .

*Primary Examiner*—Louis J. Casaregola
*Attorney, Agent, or Firm*—Jacobson, Price, Holman & Stern

[57] ABSTRACT

With the intention of achieving more stable combustion in solid-fuel ramjets, and particularly in the case of ramjets with spinning application, it is proposed that the inner surface of the ramjet fuel element (8) is provided with raised surfaces, or lands (14), preferably formed from the fuel element material. In one preferred embodiment, the lands (14) are straight and extend parallel with the longitudinal axis of the fuel element and have the same length as the fuel element. The tangenital component of the rotating gasflow generated by rotation, forces the peripheral part of the gasflow to pass over these raised surfaces (14), thereby generating standing, stabilizing vortices downstream of the raised surfaces.

20 Claims, 1 Drawing Sheet

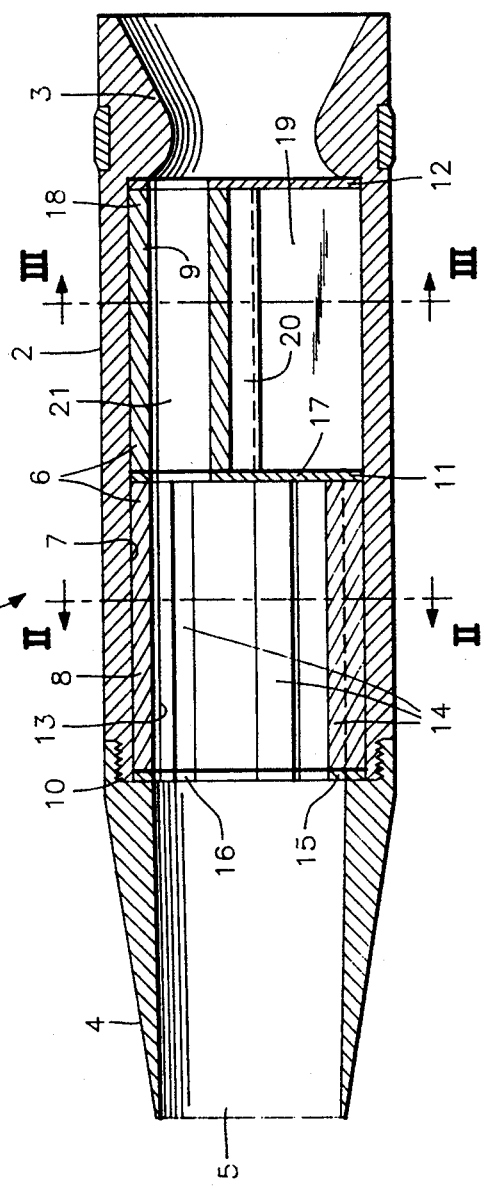
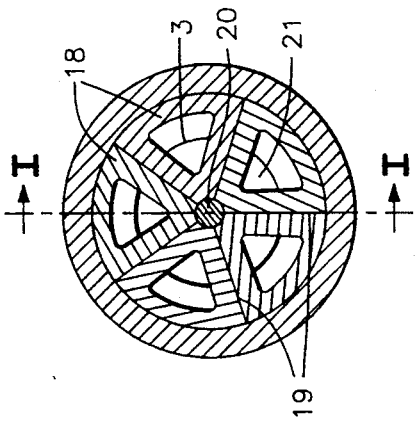
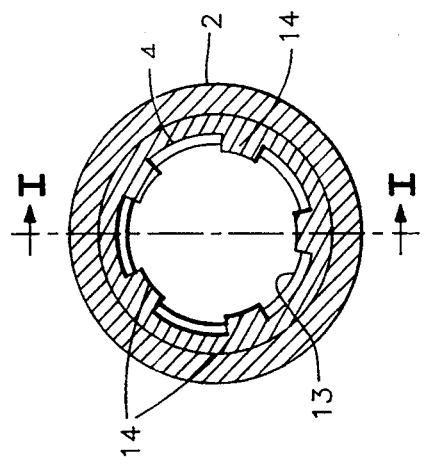

SOLID FUEL RAMJET ENGINE FOR A SPIN-STABILIZED PROJECTILE

TECHNICAL FIELD

The present invention relates to a ramjet engine. The ramjet includes means for improving combustion of the solid fuel of ramjet engines and is particularly suited for use in spin-stabilized projectiles.

BACKGROUND ART

The range and impact velocity of tube-launched projectiles can be enhanced with some form of power unit, for instance a solid fuel ramjet. This power unit uses oxygen from the surrounding air essentially for the whole of the fuel oxidation process. The propellant economy of the power unit is greatly improved in this way, in comparison with alternative rocket motors where the propellant is required to include an oxidation agent.

In principle, the ramjet is comprised of a hollow, tubular shell which is open at both ends and the front and rear openings of which function respectively as a combustion-air intake and a propulsion-gas outlet. Fuel is accommodated in the tubular shell between the openings, this fuel possibly having the form of a tubular body made for instance of a polymeric material and bonded to the outer hollow shell. In operation, the inner surface of the tubular fuel member, the combustion surface, burns and said surface will thus act as a combustion-chamber delimiting surface. One condition for initiating and continuing propulsion of the projectile is that a at least a given pressure prevails in the combustion chamber. This condition is achieved in projectiles, by launching the projectiles at a speed which correspond to a Mach number of at least about 2, therewith generating a sufficiently high so-called ram pressure in the combustion air flowing in through the intake. So that the combustion air will not prevent effective combustion of the aforesaid burning surface, a so-called flame holder is provided at the combustion chamber inlet in the most common non-rotary application of ramjets. The function of this flame holder is described in more detail herebelow.

When a ramjet of the aforedescribed kind is used with a spinning application, combustion difficulties occur because this spin results in rapid swirling of the gas in relation to the combustion chamber as it flows through said combustion chamber. The flame holders of known ramjets function satisfactorily when the gas flows along the combustion chamber but is impaired when the gas flow swirls in relation to the combustion chamber.

U.S. Pat. No. 4,796,534 describes a solution to this problem, wherein the tubular fuel member is made separate from the outer shell and is journalled in said shell for rotation about a longitudinal axis. Because of the force of inertia, the tubular fuel member will be carried by the rotation or spin of the projectile to only an insignificant extent, therewith greatly reducing rotation of the gas flow in relation to the combustion chamber. This solution, however, has the drawback of being complicated and expensive. Furthermore, the provision of a fuel-element support tube and the provision of journals reduce the useful load-carrying capacity of the projectile.

SUMMARY OF THE INVENTION

Technical problem

Flame holding becomes problematic when ramjets are used in fields, in which functional demands are also placed when the ramjet is used with a powerful spinning application. There is a need for power units of the aforedescribed kind which are able to provide stable combustion without being unduly complicated and without unnecessarily encroaching on the useful load-carrying capacity of the projectile driven by the unit.

Solution

The object of the present invention is to provide a ramjet of the kind defined in the introduction which possesses the aforesaid properties. This object is achieved with a ramjet having the characteristic features set forth in the following claims.

According to the invention, it is proposed that at least part of the fuel is tubular in configuration and can, in other respects, be configured conventionally for ramjets that are intended for non-spinning application.

The inner surface of the fuel tube is provided with one or more lands or like raised surfaces which are disposed around the inner surface of the tubular fuel member and each of said lands extends through a given distance from its one end to the other, in the longitudinal direction of the tube. These lands may, for instance, be disposed parallel with generatrices to the inner surface of the tube or at an angle thereto. In this latter case, the lands will have a helical configuration, which need not have the same pitch along the whole of its length.

In order to describe the modus operandi of the inventive ramjet, the principle for stabilizing the combustion of a ramjet intended for non-spinning application will first be described. Fuel from the inner surface of the tubular fuel member is vaporized and then combusted with the aid of the oxygen contained by the air of combustion. So that the rapidly inflowing air of combustion will not immediately flow along the burning surfaces and render combustion and stabilization of the combustion process impossible, a flame holder is placed at the forward inlet opening of the fuel tube. The flame holder consists of a restriction whose orifice forms the combustion-air inlet to the combustion chamber. The preferably planar end surface of the constriction that faces towards the combustion chamber forms a stepped, annular shoulder which extends from the edge of the constriction orifice to the inner surface of the tubular fuel member. A standing vortex is generated behind this shoulder, said vortex being composed of fuel vapors, combustion air and propulsion gases and propagates from the aforesaid shoulder partially along the combustion chamber and around said chamber. When the vertical extension of the shoulder is well adapted, this rolling vortex will assist in achieving a suitable temperature at the combustion or burning surfaces and in the combustion chamber for stable combustion of the fuel. The gas generated by combustion in the combustion chamber exits from the ramjet through an exhaust nozzle.

When a ramjet provided with a flame holder of the aforedescribed kind is used in a spin-stabilized projectile, rotation of the gas flow in the combustion chamber makes it difficult for a stabilizing, standing vortex to be generated behind the flame holder. In the case of the inventive ramjet, the inner surface of the tubular fuel member is provided with longitudinally extending raised surfaces, or lands, which, for the sake of simplicity, are first assumed to be straight and parallel with the longitudinal axis of the tubular member. The tangential component of the rotating gas flow forces the peripheral part of the gas flow to pass over each land, wherein the land flank which is downstream of the flow forms a stepped shoulder, similar to the construction means in the aforedescribed ramjet. Downstream of this shoulder there is generated, in a corresponding manner, a vortex which propagates along the combustion chamber wall on a surface whose size depends, among other things, on the height of the shoulder from the combustion chamber wall. By adapting the number and the height of the lands, which are mutually dependent variables, and by also adapting the slope of the land flanks on the downstream side of the prevailing conditions, it is possible to cover a suitable part of the combustion surface by vortex formation, so as to obtain stable and effective combustion. The resistance of the gas flow and other variables can be changed by arranging the lands at an angle to the generatrices of the tubular fuel member. This provides further means for adjusting the performance of the ramjet.

The lands or raised surfaces may be made of metal, optionally coated with fuel, and may be included in the supportive structure of the ramjet. In the preferred embodiment, however, it has been elected to allow the lands to form parts of the fuel element. This will also increase the combustion surface area. Since the lands burn more quickly than the remainder of the burning combustion surface, the total burning surface is decreased and thus also the power of the ramjet along the trajectory path of the projectile, in a manner desired in the case of certain applications. The fact that the lands decrease in height has little effect on the stability of the combustion process, since the lands shall have their greatest height at the moment of launching the projectile.

A further development of the inventive ramjet is also proposed. Distinct from the ramjet described in U.S. Pat. No. 4,796,534, the lands cause the gas flow to rotate in relatior to the surrounded space. This rotation results in high flow losses during passage through the exhaust nozzle constriction. According to this further embodiment, the ramjet includes an insert element which is comprised of mutually parallel channels which are defined by walls and which divide the gas flow into a number of part-flows prior to the gas exiting through the exhaust nozzle constriction. In this way instead of a flow which is comprised of one single rotating vortex which takes-up the entire diameter of the gas flow and which results in high tangential velocites at the exhaust nozzle, there is obtained a flow which consists of a number of parallel, axial vortices. This greatly reduces the flow losses in the exhaust or outlet nozzle, meaning that a greater thrust can be taken out. Moreover, a more effective mixture is obtained in that part of the combustion chamber which is included by the channels. This improved mixture contributes to improved efficiency. It is proposed that the walls of the insert element, which may comprise parts of the metal structure of the ramjet, are clad with fuel on all surfaces that face towards the gas flow, whereby these channels will also be included in the combustion chamber of the ramjet.

The inventive ramjet is not restricted for use in spinning applications. When provided, for instance, with helical lands, the inventive ramjet can also be used advantageously in non-spinning applications.

ADVANTAGES

A ramjet constructed in accordance with the invention affords the following advantages:

It is of simple and inexpensive construction and lacks the complicated arrangement of movable parts required by the known solution.

The turbulence generated behind a number of lands contributes to improved mixing of fuel vapors and air, and thereby improves efficiency.

The gas flow is effectively exhausted in the lee of the lancs when the lands extend spirally.

A greater combustion surface can be obtained with the aid of fuel-containing lands and partition walls.

Because the ramjet has a large combustion surface, slow-burning propellants can be used. Such a propellant is poor in oxidation agent, but rich in energy-containing fuel. The ramjet is therefore able to propel the projectile over long distances for each unit of weight of propellant.

Because the constriction in the combustion chamber inlet can be omitted, an increased gas flow corresponding to the increase in combustion surface area can be achieved without needing to increase the outer diameter of the ramjet.

BRIEF DESCRIPTION OF THE DRAWINGS

A preferred embodiment of the invention will now be described with reference to the accompanying drawings, in which corresponding parts illustrated in the various figures are identified by the same reference numerals.

FIG. 1 is a longitudinal section view on the line I of a spin-stabilized projectile provided with a solid-fuel ramjet constructed in accordance with the invention.

FIGS. 2 and 3 are, respectively, cross-sectional views taken on the lines II and III.

BEST MODE OF CARRYING OUT THE INVENTION

A ramjet-propelled tubular projectile 1 (see FIGS. 1, 2 and 3) of the present kind is mainly comprised of a projectile body 2 having an outlet nozzle 3, an inlet nose 4 which is screwed onto the projectile body and which is intended for a pitot inlet 5, a ramjet fuel charge 6, which occupies the interior space of the projectile propelled by the ramjet. In the case of the illustrated embodiment, the active part of the projectile is comprised of the projectile body, although it could, instead, be comprised of a kinetic energy-rod that lies on the longitudinal axis of the projectile. The pitot inlet can be replaced with an inlet which is provided with a central body. Although this inlet results in lower inlet losses, it is, on the other hand, more sensitive to deviations from the Mach-number for which the ramjet is constructed than the inlet chosen. If the active part of the projectile has the form of a kinetic energy-rod, the forward end of this rod could function as a central body.

The fuel charge 6 is placed into a cylindrical recess 7 formed in the projectile body 2 between the inlet nose 4 and the outlet nozzle 3. The fuel charge is comprised of a forward fuel element 8 and a rearward fuel element 9, said elements having generally the same length. The fuel elements are fixed in position by means of a generally ring-shaped disc 10, a forward wing support 11 and a rearward wing support 12, said supporting devices being located in front of, between and behind the two fuel elements.

The fuel elements are constructed in accordance with different principles and each of the elements may be used separately or together with elements that are constructed according to completely different principles. According to the present invention, the front element 8 is generally tubular. A number of straight lands or raised surfaces 14 extend from the inner surface 13 of the fuel element 8 along the whole of said element in the direction of the longitudinal axis of the tubular fuel element and parallel with said axis, said lands preferably being uniformly spaced. The number of lands used and their heights and widths shall be adapted to impart a correct function to the ramjet, and consequently these dimensions will be dealt with in the next paragraph. The disc 10 placed in front of the forward fuel element 8 has generally the same cross-section as said element 8 and is provided with tongues 15 which project inwardly from the inner edge 16 of the disc 10, so as to protect the forward ends of the lands. Similarly, the forward annular support 11 is provided with spokes 17 which, among other things, function to support the lands when the projectile is launched.

The rear fuel element 9 includes a number of tubular, sector-shaped sub-elements 18 which are fastened to the rear half of the recess 7 and also to a number of supporting, star-shaped wings 19 which are placed parallel with the longitudinal axis and which have the same lengths as the sub-elements. The wings have a rectangular shape and are fastened along one side to the recess 7 in the projectile body, from where they extend inwards towards the longitudinal axis and there joined with a connecting rod 20. The short sides of the wings are attached to spokes of the forward wing support 11 and the rear wing support 12. The spokes also form a guard and support for the sub-elements 18.

MODE OF OPERATION

The ramjet is ignited immediately after the spin-stabilized projectile is launched. This ignition can take place spontaneously at high ramjet pressures, or may be initiated by an annular ignition charge (not shown) located between the disc 10 and the forward fuel element 8. A standing, rolling vortex is formed downstream of each land by the tangential component of the peripheral part of the gas flowing through the ramjet. This vortex extends away from the lands 14 over an area whose size will depend on the height of the land. By correctly choosing the height and number of the lands, it is possible to cause vortices to cover such a large part of the combustion surface of the forward fuel element as to achieve stable combustion. The width of the lands is chosen so that the lands will have burned-out at the same time as the remainder of the fuel element.

When the gas flow has left the forward fuel element, the flow will have been caused to rotate as a result of friction with the lands. By permitting the flow to pass through the parallel channels 21 formed in the sub-element 18 of the rearward fuel element, the flow passing through the outlet nozzle 3 will have the form of a number of vortices of smaller diameter, instead of one single vortex whose diameter includes the whole of the exiting flow. This reduces the resistance of the flow in the outlet nozzle. The area of the burning surface of the ramjet can be advantageously enlarged, by coating the channel walls with fuel.

We claim:

1. A solid fuel ramjet engine for a spin-stabilized projectile having a tubular fuel element, said solid fuel ramjet engine comprising:
   a forward opening forming an intake for combustion air, and
   an inner surface defining a combustion chamber and forming a combustion surface, said inner surface having at least one elongated raised surface formed from the fuel element and extending along the fuel element, said raised surface being formed and located so that a tangential component of a gasflow contacts said raised surface and forces a peripheral part of said gasflow to generate a vortex propagating along said combustion chamber.

2. A ramjet engine according to claim 1, wherein said raised surface has the form of a land which consists of fuel material and is uniform along its length.

3. A ramjet engine according to claim 1, wherein said raised surface is comprised of a metal bar which forms part of a ramjet supporting structure.

4. A ramjet engine according to claim 1, wherein said raised surface is straight and extends parallel with one of the generatrices of the fuel element.

5. A ramjet engine according to claim 1, wherein said raised surface is helical.

6. A ramjet engine according to claim 1, wherein a second fuel element is located behind the first fuel element and said second fuel element includes a number of walls defining mutually parallel channels.

7. A ramjet engine according to claim 6, wherein said walls are clad with fuel material.

8. A solid fuel ramjet engine according to claim 1, further comprising another fuel element having parallel channels for dividing the gasflow into several rotating gasflows.

9. A solid fuel ramjet engine in combination with a spin-stabilized projectile, a tubular fuel element in said projectile, a forward opening of said projectile forming an intake for combustion air, and an inner surface of said tubular fuel element defining a combustion chamber and forming a combustion surface, said inner surface having at least one elongated raised surface formed from said fuel element and extending along said fuel element, said raised surface being formed and located so that a tangential component of a gasflow contacts said raised surface and forces a peripheral part of said gasflow to generate a vortex propagating along said combustion chamber.

10. The combination of claim 9, wherein said raised surface has the form of a land which consists of fuel material and is uniform along its length.

11. The combination of claim 9, wherein said raised surface is comprised of a metal bar which forms part of a ramjet supporting structure.

12. The combination of claim 9, wherein said raised surface is straight and extends parallel with one of the generatrices of the fuel element.

13. The combination of claim 9, wherein said raised surface is helical.

14. The combination of claim 9, wherein a second fuel element is located behind the first fuel element and said second fuel element includes a number of walls defining mutually parallel channels.

15. The combination of claim 9, wherein said walls are clad with fuel material.

16. A solid fuel ramjet engine according to claim 10, further comprising another fuel element having parallel channels for dividing the gasflow into several rotating gasflows.

17. A solid fuel ramjet engine in combination with a spin-stabilized projectile, a tubular fuel element, a forward opening of said projectile forming an intake for combustion air, and an inner surface of said tubular fuel element defining a combustion chamber and forming a combustion surface, said inner surface having at least one elongated raised surface formed from said fuel element and extending along said fuel element, said raised surface being formed and located to generate a vortex propagating along said combustion chamber.

18. A ramjet engine according to claim 17, wherein said raised surface is straight and extends parallel with one of the generatrices of the fuel element.

19. A ramjet engine according to claim 17, wherein said raised surface is helical.

20. A solid fuel ramjet engine according to claim 17, further comprising another fuel element having parallel channels for dividing the gasflow into several rotating gasflows.

* * * * *